US008690257B2

(12) United States Patent
Stiller et al.

(10) Patent No.: US 8,690,257 B2
(45) Date of Patent: Apr. 8, 2014

(54) ANTI-ROTATION ARROW RETAINER AND CLIP

(75) Inventors: Edwin L. Stiller, Auburn Hills, MI (US); Douglas L. Deaton, Hartland, MI (US); Matthew M. Bednarski, Howell, MI (US); Eric L. Stiller, Howell, MI (US); Thomas J. Jayroe, Troy, MI (US); Russel E. Strang, Tollesboro, KY (US)

(73) Assignee: Magna Seating Inc., Aurora, Ontario (CA)

( * ) Notice: Subject to any disclaimer, the term of this patent is extended or adjusted under 35 U.S.C. 154(b) by 243 days.

(21) Appl. No.: 13/203,000

(22) PCT Filed: Feb. 26, 2010

(86) PCT No.: PCT/CA2010/000288
§ 371 (c)(1),
(2), (4) Date: Aug. 24, 2011

(87) PCT Pub. No.: WO2010/096933
PCT Pub. Date: Sep. 2, 2010

(65) Prior Publication Data
US 2011/0309667 A1    Dec. 22, 2011

Related U.S. Application Data

(60) Provisional application No. 61/155,605, filed on Feb. 26, 2009.

(51) Int. Cl.
*B60N 2/58*    (2006.01)
(52) U.S. Cl.
USPC ........................ 297/452.6; 24/297

(58) Field of Classification Search
USPC ........... 297/218.1, 218.5, 452.6; 24/292, 297, 24/543
See application file for complete search history.

(56) References Cited

U.S. PATENT DOCUMENTS

| | | | |
|---|---|---|---|
| 1,853,579 A | | 4/1932 | Sallop |
| 3,632,164 A | * | 1/1972 | Radke .................. 297/452.6 |
| 3,794,378 A | | 2/1974 | Haslam et al. |
| 4,047,756 A | | 9/1977 | Ney |
| 5,820,214 A | | 10/1998 | Bessette et al. |
| 5,964,017 A | | 10/1999 | Roberts |
| 6,438,804 B1 | | 8/2002 | Romero Magarino |
| 6,568,761 B2 | | 5/2003 | Perske et al. |

(Continued)

FOREIGN PATENT DOCUMENTS

| | | |
|---|---|---|
| DE | 10034088 A1 | 1/2002 |
| EP | 1243462 A2 | 9/2002 |
| WO | 0124665 A1 | 4/2001 |
| WO | 2007008662 A2 | 1/2007 |

*Primary Examiner* — Peter Brown
(74) *Attorney, Agent, or Firm* — Miller Canfield

(57) ABSTRACT

An attachment device for securing a trim cover to foam pad. The attachment device includes an elongated attachment component coupled to the trim cover and a base component disposed within the foam pad. The attachment component includes an outwardly protruding barb and a key pad at a distal end thereof. The base component includes a retaining element having a pair of spaced apart fingers defining a gap there between and a keyway at the bottom of the retaining element between the fingers that is adapted for receiving the key. The key of the attachment component is disposed in the keyway of the retaining element and one of the fingers interacts with the barb to prevent removal of the attachment component from the base component.

10 Claims, 3 Drawing Sheets

(56) References Cited

U.S. PATENT DOCUMENTS

| | | |
|---|---|---|
| 6,874,983 B2 | 4/2005 | Moerke et al. |
| 6,899,399 B2 * | 5/2005 | Ali et al. .................... 297/452.6 |
| 7,134,730 B2 | 11/2006 | Flegal et al. |
| 7,351,023 B2 | 4/2008 | Scroggie et al. |
| 7,390,059 B2 | 6/2008 | Brockschneider et al. |
| 7,481,489 B2 * | 1/2009 | Demick ..................... 297/218.1 |
| 7,559,100 B2 * | 7/2009 | Pedde et al. ............... 297/218.2 |
| 8,197,010 B2 * | 6/2012 | Galbreath et al. ......... 297/452.6 |
| 2002/0101109 A1 * | 8/2002 | Stiller et al. .............. 297/452.6 |
| 2003/0001421 A1 | 1/2003 | Schmidt |

\* cited by examiner

ANTI-ROTATION ARROW RETAINER AND CLIP

BACKGROUND OF THE INVENTION

1. Field of the Invention

The invention relates to an automotive vehicle seat having a contoured foam pad encased by a trim cover. More particularly, the invention relates to an attachment device for securing the trim cover to the foam pad.

2. Description of Related Art

Upholstered seats, including automotive vehicle seats are well known in the art. Automotive vehicle seats include a seat cushion and a seat back for supporting a seat occupant. Typically, the construction of each of the seat cushion and seat back includes a rigid frame structure for supporting a contoured foam pad encased by a trim cover that is tightly conformed to the contour of the foam pad. Typical materials for the trim cover include cloth, vinyl and leather. The trim cover should be easily and inexpensively attached to the foam pad, but should resist developing problems such as wrinkling and shifting around on the foam pad. Grooves may be provided in the foam pad to provide an attractive appearance to the seat and, sometimes, to define a junction where adjacent sections of the trim cover come together.

In the prior art, there are many different approaches for attaching the trim cover to the foam pad. Some of the more common approaches include the use of hog rings, VELCRO®, various clips, and adhesives. While these previous approaches tend to satisfy the function of attaching the trim cover to the foam pad without much wrinkling or shifting, they are expensive and can be labor intensive.

It is desirable, therefore, to provide attachment of a trim cover to a foam pad that is inexpensive, easily and quickly performed, with great accuracy and reproducibility. It is further desirable to provide attachment of adjacent sections of a trim cover to a foam pad along a predefined groove.

SUMMARY OF THE INVENTION

According to one aspect of the invention, an attachment device is provided for securing a trim cover to a foam pad of a vehicle seat assembly. The attachment device includes an elongated attachment component extending between a proximal end adapted to be fixedly secured to the trim cover and distal end adapted to be operatively coupled to the foam pad. The elongated attachment component includes an outwardly protruding barb and a key at the distal end thereof. A base component is adapted to be fixedly disposed within the foam pad and includes a retaining element having a pair of spaced apart fingers defining a gap therebetween and a keyway at the bottom of the retaining element between the pair of spaced apart fingers. The key of the elongated attachment component is disposed in the keyway of the retaining element and one of the pair of spaced apart fingers interacts with the outwardly protruding barb to prevent removal of the attachment component from the base component thereby securing the trim cover to the foam pad.

BRIEF DESCRIPTION OF THE DRAWINGS

Other advantages of the present invention will be readily appreciated as the same becomes better understood by reference to the following detailed description when considered in connection with the accompanying drawings, wherein.

DETAILED DESCRIPTION OF THE PREFERRED EMBODIMENT

Figure 1:
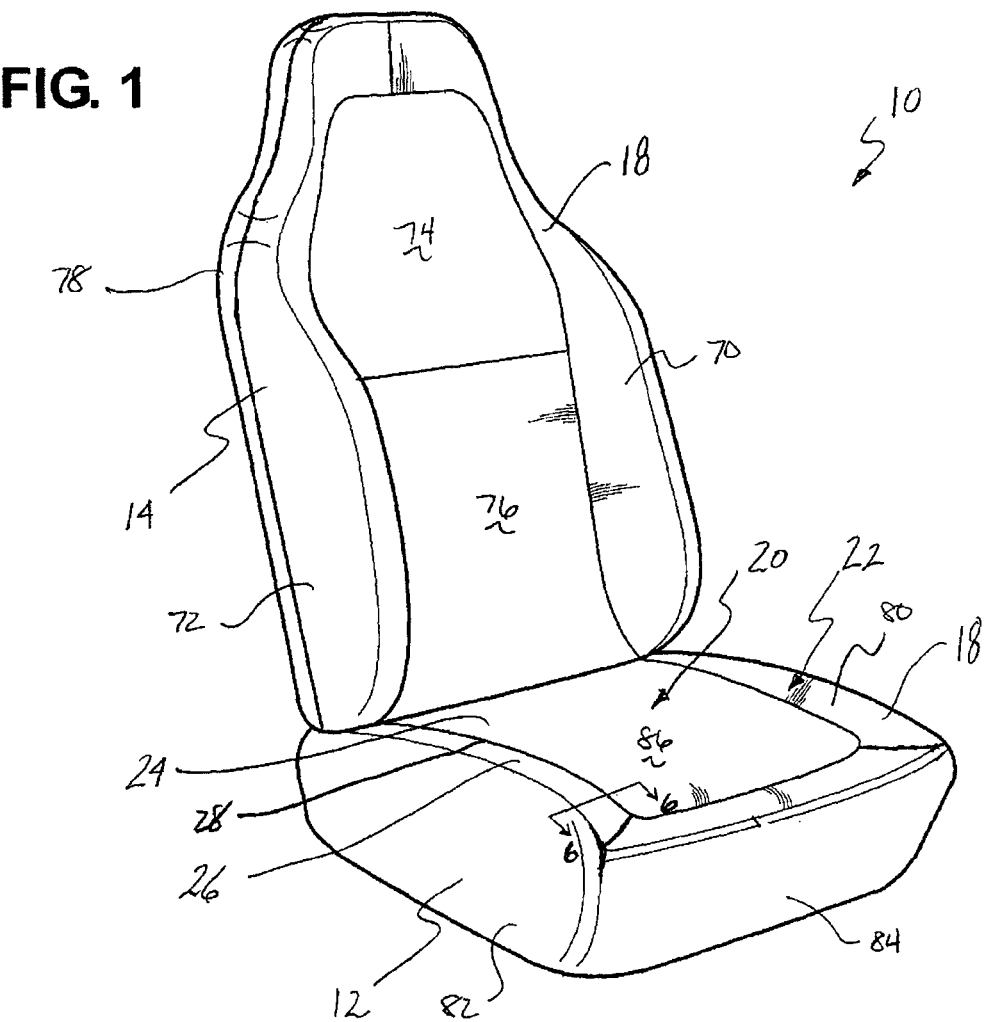
FIG. 1 is a perspective view of a seat assembly having an interior foam pad and an exterior trim cover which has been assembled using an attachment device according to one embodiment of the invention.
Figure 6:
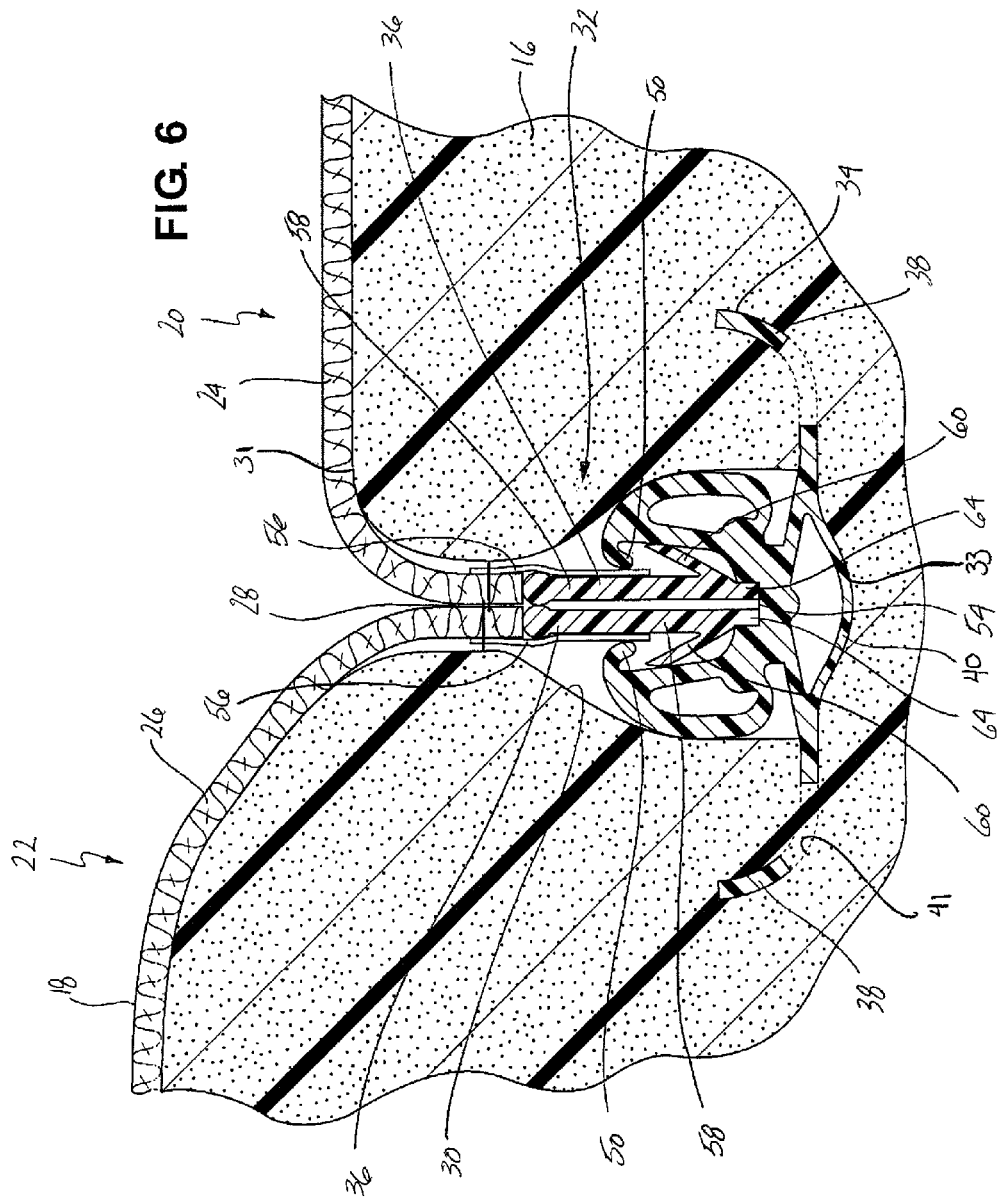
FIG. 6 is a cross-sectional view along lines 6-6 in FIG. 1.

Referring to the Figures, FIG. 1 illustrates a seat assembly 10 for use in an automotive vehicle. The seat assembly 10 includes a generally horizontal seat cushion 12 and a generally vertical seat back 14 operatively coupled to the seat cushion 12 for supporting an occupant on the seat assembly 10. The construction of each of the seat cushion 12 and seat back 14 includes a rigid frame structure (not shown) for supporting a contoured foam pad 16, shown in FIG. 6, encased by a trim cover 18, as commonly known to one skilled in the art. The foam pad 16 is typically a synthetic foamed material, for example polyurethane. Typical materials for the trim cover 18 include cloth, vinyl and leather.

While the following description references the seat cushion 12, it is appreciated that the description also generally applies to the seat back 14. In the embodiment shown, the seat cushion 12 includes a generally central seating area 20 and a generally peripheral bolster area 22 for thigh and hip support. The trim cover 18 encasing the foam pad 16 of the seat cushion 12 in the embodiment shown includes a first trim cover section 24 corresponding to the seating area 20 and a second trim cover section 26 corresponding to the bolster area 22. It should be appreciated that it is contemplated that any number of trim cover sections may be provided depending upon the desired form and style of the foam pad 16 and seat assembly 10. It is further contemplated that the first 24 and second 26 trim cover sections, or other trim cover sections can be different materials and/or different colors without varying from the scope of the invention.

Figure 2:
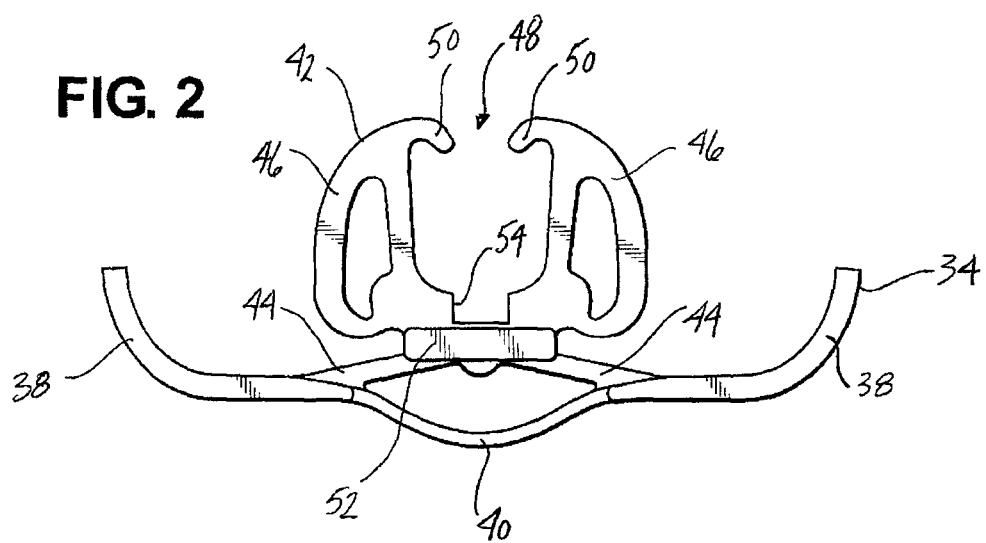
FIG. 2 is an end view of a base component of the attachment device.
Figure 3:
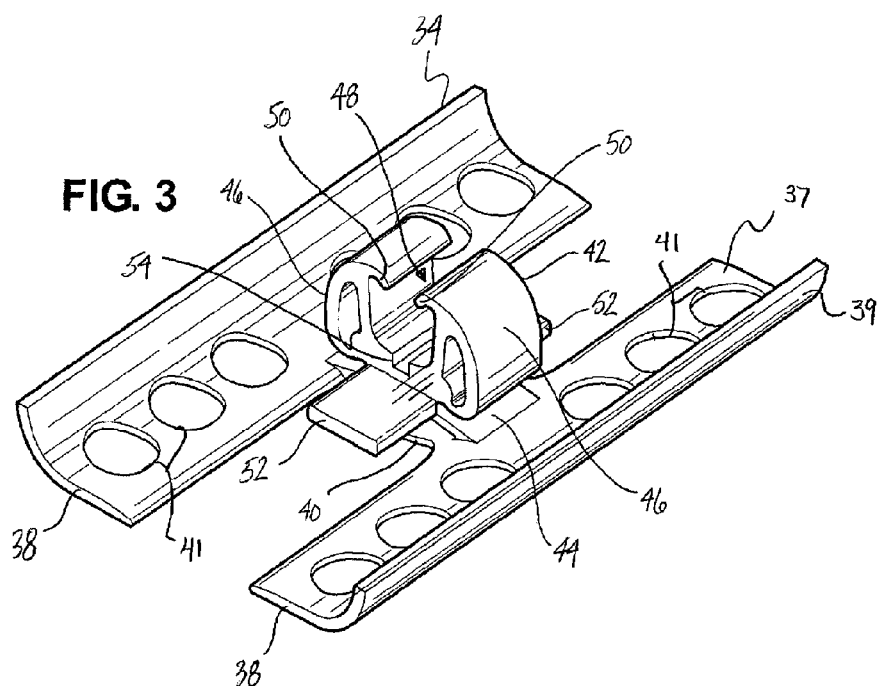
FIG. 3 is a perspective view of the base component.
Figure 4:
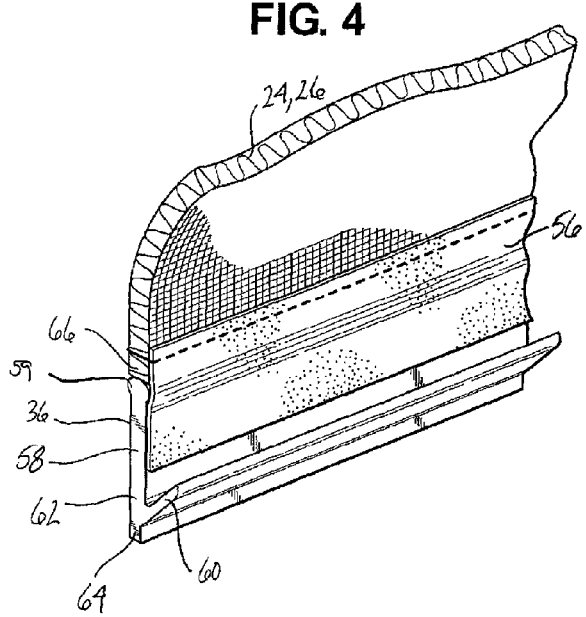
FIG. 4 is a perspective view of a section of the trim cover and an elongated attachment component of the attachment device.
Figure 5:
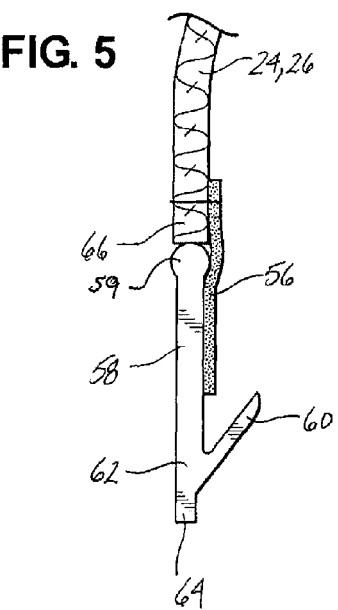
FIG. 5 is an end view of the trim cover and the elongated attachment component of the attachment device.

The first trim cover section 24 and the second trim cover section 26 form a demarcation line 28 between the seating area 20 and the bolster area 22. The first trim cover section 24 and the second trim cover section 26 are secured to the foam pad 16 along the demarcation line 28. More specifically, an elongated draw-in channel or groove 30 is formed in the foam pad 16 corresponding to the demarcation line 28 and an attachment device 32 for securing the respective first 24 and second 26 trim cover sections to the foam pad 16 is located along some or all of the groove 30. The groove 30 extends from a top surface 31 of the foam pad 16 to a bottom surface 33 recessed below the top surface 31 of the foam pad 16. The attachment device 32 includes a base component 34, shown in FIGS. 2, 3, and 6, and an elongated attachment component 36, shown in FIGS. 4 through 6.

The base component 34 is disposed along the bottom surface 33 of the groove 30 and is embedded within the foam pad 16. The base component 34 is typically plastic and is molded into the foam pad 16 during formation of the foam pad 16 itself. In the current embodiment, the base component 34 includes a pair of wings 38 protruding laterally therefrom into the body of the foam pad 16. The wings 38 extend in a longitudinal direction parallel to and along opposite sides of bottom surface 33 of the groove 30. The wings 38 are generally J-shaped having a flat portion 37 and an upwardly curved portion 39 to retain the base component 34 within the foam pad 16. The flat portions 37 include a plurality of spaced apart openings 41 therein such that during the molding process of the foam pad 16, foam material passes through the openings 41 and around the wings 38 to mold, embed, and lock the base component 34 within the foam pad 16. The wings 38 are connected by a generally U-shaped coupling portion 40 seated along the bottom surface 33 of the groove 30. The base component 34 also includes a retaining element 42 that is located between the wings 38 and disposed in the groove 30. The retaining element 42 is connected to the wings 38 by a pair of legs 44. The retaining element 42 includes a pair of spaced apart and opposing D-shaped fingers 46 defining a gap 48 therebetween. Each one of the fingers 46 is shaped to include a hook or catch 50 at a distal end thereof, the purpose of which is described in detail below. The base component 34 further includes a support 52 extending from either side of the retaining element 42 in the longitudinal direction. Finally, a generally U-shaped channel defining a keyway or recess 54 is formed in the bottom of the retaining element 42, generally between the fingers 46. A continuous elongated base component or a plurality of the base components 34 may be disposed at spaced apart intervals along the groove 30 depending upon the desired amount of attachment between the trim cover 18 and the foam pad 16. Generally, in a typical bucket seat assembly three base components 34 are positioned along the groove 30 in a front-to-rear direction relative to the seat cushion 12 and two base components 34 are positioned along the groove 30 in a side-to-side direction relative to the seat cushion 12.

Each of the first 24 and second 26 trim cover sections include the elongated attachment component 36 of the attachment device 32. The attachment component 36 includes a fabric connecting strip 56 and a plastic locking strip 58. The locking strip 58 is coupled to one of the first 24 and second 26 trim cover sections by the connecting strip 56. The locking strip 58 extends between a proximal end 59 connected to the trim cover section and a distal end 62. The locking strip 58 includes a barb 60 protruding at an angle outwardly near the distal end 62 of the locking strip 58 and the distal end 62 defines a key 64 that is shaped and adapted to be received in the keyway 54 of the retaining element 42. The connecting strip 56 is preferably secured to the proximal end 59 of the locking strip 58 using a suitable adhesive and sewn to a distal end 66 of the respective one of the first 24 and second 26 trim cover sections. The attachment component 36 extends generally the entire longitudinal length of the groove 30. The locking strip 58 is generally rigid in a vertical direction and flexible in the longitudinal direction, thereby allowing the locking strip 58 to follow the curved path defined by the groove 30. In the embodiment shown, the cross-sectional shape of the locking strip 58 is generally a half arrow. It is appreciated, however, that the cross-sectional shape of the locking strip 58 can be any of a variety of suitable shapes capable of being retained by the retaining element 42, e.g., a bead shape, a full arrow shape, etc.

When the seat cushion 12 is assembled, the first 24 and second 26 trim cover sections are secured to the foam pad 16 to encase the foam pad 16. More specifically, the first trim cover section 24 is oriented with respect to the seating area 20 of the foam pad 16 and the attachment component 36 coupled to the first trim cover section 24 is manipulated to correspond with the groove 30. The locking strip 58 is then inserted into the groove 30 and received by the retaining element 42 of each of the plurality of base components 34. The distal end 62 of the locking strip 58 is inserted into the gap 48 between the fingers 46 of the retaining element 42 and the key 64 is disposed in the keyway 54. Once the locking strip 58 is inserted into the gap 48, the catch 50 interacts with the barb 60 to prevent removal of the locking strip 58. Additionally, with the key 64 disposed in the keyway 54 side-to-side rocking of the locking strip 58 is prevented and the locking strip 58 is maintained in a generally vertical orientation.

In a similar fashion, the second trim cover section 26 is oriented with respect to the bolster area 22 of the foam pad 16 and the attachment component 36 coupled to the second trim cover section 26 is manipulated to correspond with the groove 30. The locking strip 58 is then inserted into the groove 30 and received by the retaining element 42 of each of the plurality of base components 34. The distal end 62 of the locking strip 58 is inserted into the gap 48 between the fingers 46 of the retaining element 42 and the key 64 is disposed in the keyway 54. Once the locking strip 58 is inserted into the gap 48, the catch 50 interacts with the barb 60 to prevent removal of the locking strip 58. Additionally, with the key 64 disposed in the keyway 54 side-to-side rocking of the locking strip 58 is prevented. The attachment components 36 of the first 24 and second 26 trim cover sections are oriented in opposing fashion so that the barbs 60 protrude in opposite directions and in assembly the locking strips 58 abut each other back to back.

It is noted that without the key 64 and keyway 54, side-to-side rocking of the locking strips 58 may occur. Once one locking strip 58 is inserted into the retaining element 42, any side-to-side rocking will lead to high insertion efforts for the second locking strip 58 or possible uncoupling between the catch 50 and barb 60. In the example set forth above, the locking strip 58 coupled to the first trim cover section 24 is inserted first. Therefore, any side-to-side rocking of the locking strip 58 coupled to the first trim cover section 24 will lead to high insertion efforts for the locking strip 58 coupled to the second trim cover section 26. It is appreciated, however, that the order of securing the trim cover sections 24, 26 to the foam pad 16 does not vary the scope of the invention.

It is further appreciated that the attachment device 32 allows for a multi-piece trim cover 18 having any number of trim cover sections to be secured to the foam pad 16. The multi-piece trim cover 18 simplifies assembly, eliminating the need to manipulate a single bag-like trim cover over the seat back 14 or seat cushion 12. The multi-piece trim cover 18 also provides flexibility in seat designs by allowing mixing and matching of trim cover materials and colors. For example, for the seat back 14, the multi-piece trim cover 18 may include separate sections such as a right-hand bolster section 72, a left-hand bolster section 70, an upper insert section 74, a lower insert section 76, and a back panel 78 that wraps around the top and sides of the seat back 14 to fully enclose the foam pad 16. It is contemplated that the back panel may be a rigid plastic panel. For the seat cushion 12, the multi-piece trim cover 18 may include separate sections such as a right-hand bolster section 82, a left-hand bolster section 80, a front panel 84, and a center insert section 86.

The invention has been described here in an illustrative manner, and it is to be understood that the terminology used is intended to be in the nature of words of description rather than limitation. Many modifications and variations of the present invention are possible in light of the above teachings. It is, therefore, to be understood that within the scope of the appended claims, the invention may be practiced other than as specifically enumerated within the description.

What is claimed:

1. An attachment device for securing a trim cover to a foam pad of a vehicle seat assembly, said attachment device comprising:
an elongated attachment component extending between a proximal end adapted to be fixedly secured to the trim cover and a distal end adapted to be operatively coupled to the foam pad, said elongated attachment component including an outwardly protruding barb and key at said distal end thereof; and
a base component adapted to be fixedly disposed within the foam pad, said base component including a retaining element having a pair of spaced apart fingers defining a gap therebetween and a keyway at the bottom of said retaining element between said pair of spaced apart fingers, said keyway adapted for receiving said key therein;
wherein said key forms a rectangular shaped projection extending from said distal end of said attachment component and said keyway forms an elongated rectangular shaped groove at the bottom of said retaining element for receiving said key, and
wherein said key of said attachment component is disposed in said keyway of said retaining element and one of said pair of spaced apart fingers interacts with said outwardly protruding barb to prevent removal of said attachment component from said base component thereby securing the trim cover to the foam pad.

2. An attachment device as set forth in claim 1 wherein each of said fingers of said base component extends between a proximal end defined by a support and a distal end defined by a catch for interlocking with said barb of said attachment component.

3. An attachment device as set forth in claim 2 wherein said attachment component includes a longitudinally extending locking strip extending between said proximal end and said distal end and a connecting strip fixedly secured to said proximal end of said locking strip and adapted to be fixedly secured to said trim cover.

4. An attachment device as set forth in claim 3 wherein said base component includes a pair of spaced apart elongated wings extending from said retaining element adjacent each of said fingers, said wings adapted to fixedly secure said base component to the foam pad.

5. An attachment device as set forth in claim 4 wherein said wings include a flat portion having a plurality of spaced apart openings and a curved portion projecting upwardly from said flat portion and said wings adapted to be embedded with the foam pad.

6. An attachment device as set forth in claim 5 wherein said wings are interconnected in parallel by a U-shaped coupling portion and said retaining element is fixedly secured to said wings by a pair of legs extending between said finger and said flat portion, respectively.

7. A seat assembly for use in an automotive vehicle comprising:
a seat cushion and a seat back, each of said seat cushion and seat back having a foam pad and a trim cover encasing said foam pad; and
an attachment device for securing said trim cover to said foam pad, said attachment device including an elongated attachment component extending between a proximal end fixedly secured to the trim cover and a distal end operatively coupled to the foam pad, said elongated attachment component including an outwardly protruding barb and a key at said distal end thereof, and a base component fixedly disposed within the foam pad and including a retaining element having a pair of spaced apart fingers defining a gap therebetween and a keyway at the bottom of said retaining element between said pair of spaced apart fingers, wherein said key forms a rectangular shaped projection extending from said distal end of said attachment component and said keyway forms an elongated rectangular shaped groove at the bottom of said retaining element for receiving said key, and wherein said key of said attachment component is disposed in said keyway of said retaining element and one of said pair of spaced apart fingers interacts with said outwardly protruding barb to prevent removal of said attachment component from said base component thereby securing said trim cover to said foam pad.

8. A seat assembly as set forth in claim 7 wherein said trim cover includes at least a first trim cover section and a second trim cover section secured to said foam pad by said attachment device.

9. A seat assembly as set forth in claim 8 wherein each of said trim cover sections includes a distal end fixedly secured to said proximal end of said attachment component and said foam pad includes an elongated groove recessed therein and extending from a top surface of said foam pad to a bottom surface.

10. A seat assembly as set forth in claim 9 wherein said base component is fixedly secured to said bottom surface of said foam pad for interconnecting with said attachment component to secure said trim cover sections to said foam pad.

* * * * *